United States Patent
Thummala et al.

(10) Patent No.: US 12,524,565 B2
(45) Date of Patent: Jan. 13, 2026

(54) SECURITY DESCRIPTION FRAMEWORK

(71) Applicant: Workday, Inc., Pleasanton, CA (US)

(72) Inventors: Vamsi Thummala, Pleasanton, CA (US); Prasanna JayaPrakash, Livermore, CA (US); Gary Heck, Pleasanton, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 18/652,305

(22) Filed: May 1, 2024

(65) Prior Publication Data

US 2024/0281556 A1 Aug. 22, 2024

Related U.S. Application Data

(63) Continuation of application No. 17/459,914, filed on Aug. 27, 2021, now Pat. No. 12,001,580.

(51) Int. Cl.
*G06F 21/62* (2013.01)
*G06F 16/24* (2019.01)

(52) U.S. Cl.
CPC .......... *G06F 21/6227* (2013.01); *G06F 16/24* (2019.01)

(58) Field of Classification Search
CPC ............................. G06F 21/6227; G06F 16/24
See application file for complete search history.

(56) References Cited

U.S. PATENT DOCUMENTS

| | | | |
|---|---|---|---|
| 8,010,560 B2 | 8/2011 | Becker | |
| 8,234,299 B2 | 7/2012 | Bird | |
| 8,661,555 B2 | 2/2014 | Miseldine | |
| 9,002,803 B2 * | 4/2015 | Qayyum | G06F 21/6218 707/687 |
| 9,111,114 B1 * | 8/2015 | Choi | G06F 21/6227 |
| 9,519,795 B2 | 12/2016 | Guarrieri | |
| 9,753,737 B2 * | 9/2017 | Munday | G06F 21/6218 |
| 10,097,522 B2 * | 10/2018 | Philipp | H04L 9/0894 |
| 10,248,810 B2 | 4/2019 | Bisaga | |
| 10,380,334 B2 * | 8/2019 | Gopi | G06F 21/6227 |
| 10,540,513 B2 | 1/2020 | Van Hoof | |
| 10,642,990 B2 * | 5/2020 | Pattabhiraman | G06F 16/26 |
| 10,671,751 B2 * | 6/2020 | Schneider | G06F 16/254 |
| 10,713,376 B2 * | 7/2020 | Timmerman | G06F 16/23 |
| 10,872,162 B2 * | 12/2020 | Qayyum | G06F 16/24573 |
| 11,275,850 B1 * | 3/2022 | Brandwine | G06F 16/24564 |
| 11,531,931 B2 * | 12/2022 | Enuka | G06N 20/00 |
| 11,741,100 B2 | 8/2023 | Schneider | |
| 12,254,100 B2 * | 3/2025 | Wei | G06F 16/2255 |
| 2010/0030725 A1 | 2/2010 | Mendis | |
| 2010/0030737 A1 * | 2/2010 | Scheuber-Heinz | G06F 21/6227 707/E17.014 |
| 2010/0071067 A1 | 3/2010 | Bardowell | |
| 2016/0019288 A1 * | 1/2016 | Knechtel | G06F 21/6227 707/736 |
| 2017/0163638 A1 * | 6/2017 | Kisters | G06F 21/32 |

(Continued)

*Primary Examiner* — Viral S Lakhia
(74) *Attorney, Agent, or Firm* — Cooper Legal Group, LLC

(57) ABSTRACT

The present application discloses a method, system, and computer system for enforcing security with respect to a database. The system includes a database configured to receive a query, wherein the query is modified to comprise one or more security predicates; determine data to return in response to the query by examining the one or more security predicates with respect to security for a field; and return the determined data in response to the query.

20 Claims, 9 Drawing Sheets

(56) References Cited

U.S. PATENT DOCUMENTS

2018/0075251 A1\* 3/2018 Van Hoof ............ G06F 21/6227
2019/0340283 A1\* 11/2019 Schneider ......... G06F 16/24542
2021/0099293 A1\* 4/2021 Aleksander ........... H04L 9/3239
2021/0303720 A1\* 9/2021 Creenaune .......... H04L 63/0428

\* cited by examiner

600

SECURITY DESCRIPTION FRAMEWORK

CROSS REFERENCE TO OTHER APPLICATIONS

This application is a continuation of U.S. patent application Ser. No. 17/459,914 entitled SECURITY DESCRIPTION FRAMEWORK filed Aug. 27, 2021, which is incorporated herein by reference for all purposes.

BACKGROUND OF THE INVENTION

A system for big data processing comprises a system for receiving data, storing data, processing data, etc. Big data processing systems typically comprise a large number of elements in one or more datasets. The one or more data sets are accessed by users associated with an organization. For example, users may input queries to a client terminal, and the queries are performed by the system for data processing. At scale, the number of accesses or queries performed against the one or more datasets is very large. For example, for large organizations, the number of transactions (e.g., queries) performed against the one or more datasets can exceed 20 million transactions per day. A system may perform security evaluation in connection with accessing or querying a database. As the number of access or query transactions increases to a large scale, the security evaluation becomes a bottleneck for efficient processing of the access or query transactions.

BRIEF DESCRIPTION OF THE DRAWINGS

Various embodiments of the invention are disclosed in the following detailed description and the accompanying drawings.

DETAILED DESCRIPTION

Figure 1:
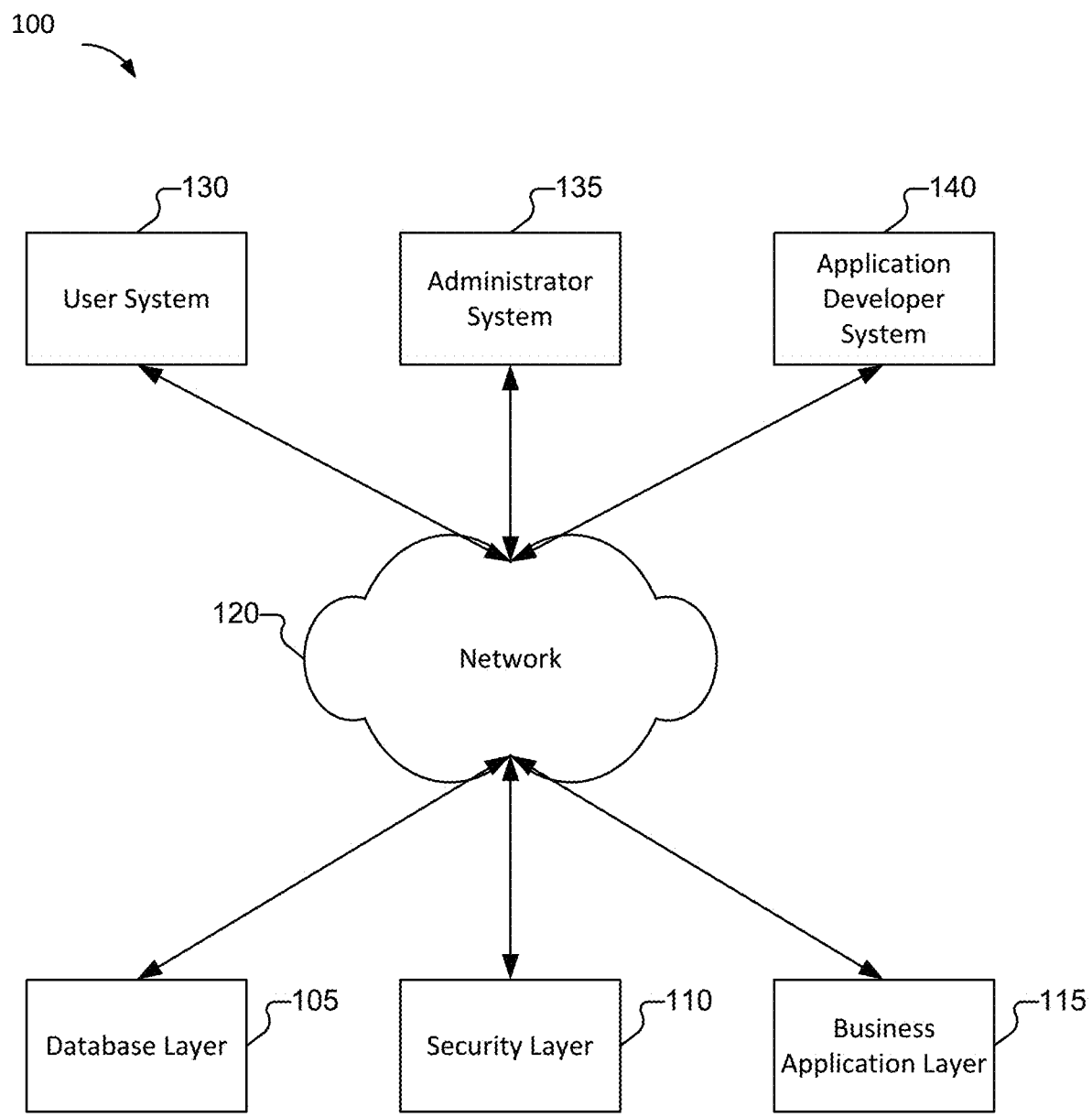
FIG. 1 is a block a diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a tenant may be an organization associated with a database, such as a client of a software as a service provider. The tenant may be a company, a department unit, etc.

A system for enforcing security with respect to information in a database (e.g., one or more datasets) is disclosed. The system comprises one or more processors and a memory. The processors are configured to receive a user query from a user, determine one or more user security privileges for the user, configure a query string, query a database to return results based at least in part on the query string, obtain the results, and provide the results to the user. The query string may be based at least in part on the user query. The query string may comprise one or more security predicates that are based at least in part on the one or more user security privileges. The memory may be coupled to the one or more processors, and configured to provide the one or more processors with instructions.

According to various embodiments, a system and/or method for enforcing security with respect to (e.g., against) one or more datasets is provided. In some embodiments, a database comprises one or more data fields (e.g., indexed fields), and the one or more data fields have a corresponding security field. For example, the database may be configured to include one or more security descriptors. The one or more descriptors may include a value or criteria that is used to enforce security with respect to a part of a database. In some embodiments, the database is configured to comprise a security field associated with an indexed field that stores information pertaining to a dataset. The security field may be configurable to include the one or more security descriptors corresponding to the indexed field. In some embodiments, each indexed field in the database has a corresponding one or more security fields comprising at least one security descriptor.

According to various embodiments, a security descriptor is used to set criteria associated with permitted access to information in the corresponding information field (e.g., indexed field) of a dataset (e.g., a database). For example, the security descriptor is used to enforce security with respect to the information in the corresponding information field of the database. In some embodiments, the value or criteria comprised in (or corresponding to) a security descriptor is used as a filter in connection with returning results to a query for a database. According to various embodiments, a security descriptor is used in connection with filtering information that is responsive to a user query to return a subset of such responsive information that the user associated with the user query is permitted to access.

As an illustrative example, if a human resources manager queries a dataset for a compensation spreadsheet of users (e.g., employees) associated with a tenant, results that are responsive to the query may be compensation information for each user associated with the tenant. However, the human resources manager may only have permission to access compensation information for employees having a role or title that is senior director or lower with respect to an employee hierarchical structure associated with the tenant. The system may compare a user security privilege associated with the human resources manager with a security descriptor associated with the information field of the dataset (e.g., an indexed field) corresponding to compensation. The various results having compensation information comprised in the information field corresponding to compensation may be filtered to remove compensation information for employees having a role or title that is senior director higher (e.g., in order for the database to return only compensation information for which the human resources manager has access).

According to various embodiments, security of information (e.g., with respect to enforcing access rights to such information) is enforced at a database layer. In some embodiments, one or more attributes or user security privileges are passed from a query layer and/or a business intelligence layer to a database layer. The one or more attributes or user security privileges may be passed to the database layer in connection with a user query (e.g., a query to be run against a dataset comprised in the database layer). According to various embodiments, in response to receiving the user query and the one or more attributes or user security privileges, the database layer may use the one or more attributes or user security privileges to determine information that the user associated with the query is permitted to access (e.g., the information to be returned as a result to the user query). The database layer may be configured in a manner that an indexed field has a corresponding security descriptor that is used to determine whether information that is responsive to the user query that should be returned to the user. For example, the database layer may apply criteria in the user query as a filter for results (e.g., information) that are responsive to the user query, and apply criteria associated with (e.g., comprised in) the security descriptor (e.g., the security descriptor associated with the one or more indexed fields associated with the results that are responsive to the query, such as the one or more indexed fields from which the results are obtained) to filter the results that are responsive to the user query and obtain results that are responsive to the user query and that the user has the requisite security privileges (e.g., access privileges). In some embodiments, the order in which the security descriptors are used as a filter and the criteria in the user query are used as a filter may be interchanged.

According to various embodiments, the system may store a user profile associated with the human resources manager. In some embodiments, the user profile comprises one or more attributes associated with the user (e.g., the human resources manager). Examples of the one or more attributes include user role, title, location, office, cost center, department, sub-organization (within the tenant), identification that the user is a participant on a particular project, user identifier, level on a hierarchy within the tenant organization, etc. Various other attributes may be comprised in the user profile.

According to various embodiments, the one or more attributes may be used in connection with setting one or more user security privileges of a user. In some embodiments, the one or more attributes may be used as a security privilege. As an example, enforcement of access restrictions to certain information in a database may be based at least in part on (i) the one or more user security privileges of a user, and (ii) the applicable security descriptors associated with such certain information in the database. For example, the enforcement of access restrictions to certain information in a database may comprise comparing (i) the one or more user security privileges of a user, and (ii) the applicable security descriptors associated with such certain information in the database. Access may be permitted to the information if the one or more user security privileges of a user matches (e.g., is consistent with) the applicable security descriptors associated with such certain information in the database. If the one or more user security privileges of a user (or the one or more security predicates corresponding to the one or more security privileges) and the one or more security descriptor associated with certain information in the database are consistent with permitted access to such information, the user may be permitted with access to such information (e.g., if such information is responsive to the user query, etc.).

According to various embodiments, the database layer does not return information from the dataset to which the user does not have the applicable access privilege. For example, the database layer does not return information for which the user associated is permitted to access according to one or more security descriptors associated with information in the dataset. In some embodiments, the database layer does not return information for which the user associated is permitted to access according to a determination of whether the one or more security descriptors associated with information in the dataset match one or more security privileges associated the user, and/or the security descriptors are consistent with the one or more security privileges associated the user. In some embodiments, one or more security privileges associated with the user may be provided to the database layer using one or more security predicates. For example, the one or more security predicates are communicated to the database layer in connection with a query string corresponding to a user query (e.g., the query string may be configured based at least in part on the one or more security predicates). The application of security at the database layer may reduce the amount of information loaded from the database layer to memory.

According to various embodiments, security enforcement pertaining to access to information in a dataset is configurable on a field-by-field basis. The security enforcement may be configured based on the setting/defining of the security descriptors associated with a particular field. The criteria comprised in the security descriptors may indicate an attribute or privilege that a user is required to have in order access information in the field associated with the security descriptors.

According to related art, security enforcement is a bottleneck for systems having very large numbers of transactions (e.g., queries to a database). The security enforcement is generally a bottleneck because of limitations with respect to the throughput and/or response rate from a query layer or security layer. In related art, all information responsive to a query is returned to the security layer or query layer regardless of whether a user to whom responsive information is to be provided has access to such information. The security layer and/or query layer may then enforce the applicable security policies. However, such application of security policies is performed after the intensive use of resources to transfer data from the database to memory for the query layer or security layer to use to process.

In addition to the above, related art systems such as related art systems using an object-oriented database require reports to provide information responsive to a query, where such reports require customer development to apply access/security enforcement with respect to various information in a dataset. In some such related art systems, a developer would need to specifically develop a security protocol to develop security for a field of information. However, even if security were applied to a field, when a report is provided to a user querying the dataset, the user is generally not able to drill down on desired fields.

The system according to various embodiments improves the computer and/or system by enabling a more efficient enforcement of security with respect to information stored in one or more datasets (e.g., enforcement of user privileges to access information). The system (e.g., a query layer, a business intelligence layer, etc.) configures a query string to include one or more security predicates, and the query string is provided to a database layer. The security of, or access to, the information in the database may be secured based at least in part on the database layer enforcing security by returning to the user (e.g., via the query layer) information to which the user has access privilege(s). For example, the database layer does not return information from the dataset to which the user does not have the applicable access privilege. The system reduces the transmission of information from the database layer to the query layer or business intelligence layer. The system according to various embodiments provides a more efficient security enforcement and reduces or removes the bottleneck of security enforcement manifested by systems according to the related art. In addition to improving the efficiency of enforcing the security associated with user access permissions to certain information, the system according to various embodiments is more extensible in a manner that allows a tenant (e.g., a customer) to configure security to information in a particular field of the database based on its own security policies. For example, the tenant may configure security on a field-by-field basis such as by setting the field descriptors for the various fields in accordance with the tenant's security policies. Such configurable security enforcement reduces the reliance on service providers (e.g., the software as a service provider associated with the database) and/or on the custom development of reports. In some embodiments, the database comprises an object-oriented database, where the security for a field is designated by having an attribute associated with a field type, and where a query received by the database includes one or more security predicates that are examined by the database with respect to the security for the field when determining which data of which fields are to be returned in response to the query. In some embodiments, the database field security is stored as information in a row of the database that is examined by the database when determining which data of which fields are to be returned in response to the query. In some embodiments, the system improves efficiency of security by generating additional security add-ons to a query, pre-configuring the database with field-associated security data, and only returning data from a database response to that query that the query add-on security and field associated security indicate are appropriate (e.g., by matching the add-on security indicators with the field associated indicators).

FIG. 1 is a block a diagram of a network system according to various embodiments of the present application. In the example illustrated in FIG. 1, system 100 includes database layer 105, security layer 110, business application layer 115, user system 130, administrator system 135, and application developer system 140. System 100 further includes one or more networks such as network 120 over which the one or more user system 130 and/or administrator system 135 communicate with database layer 105, security layer 110, and/or business application layer 115 (which may include a business intelligence layer). In various embodiments, network 120 includes one or more of a wired network, and/or a wireless network such as a cellular network, a wireless local area network (WLAN), or any other appropriate network. System 100 further includes security layer 110. In some embodiments, database layer 105, security layer 110, and/or business application layer 115 is implemented by a server. The server may correspond to a single server or a plurality of servers. Similarly, system 100 may include various other systems or terminals.

In various embodiments, user system 130 is implemented by one or more client terminals such as a personal computer, a mobile phone, a tablet, or any other appropriate user device. User system 130 communicates with database layer 105, security layer 110, and/or business application layer 115 via a web-interface. For example, user system 130 communicates with database layer 105, security layer 110, and/or business application layer 115 via a web-browser installed on user system 130. The user system 130 may query database layer 105 via business application layer 115. For example, business application layer 115 may provide an interface via which a user may input a user query (e.g., one or parameters to be used in connection with running a query against one or more datasets comprised in database layer 105). As another example, user system 130 communicates with database layer 105, security layer 110, and/or business application layer 115 via an application running on user system 130. A user uses user system 130 to access database layer 105. For example, a user uses user system 130 to access human resources database data on database layer 105, a user uses user system 130 to access financial database data on database layer 105, a user uses user system 130 to modify data on database layer 105, a user uses user system 130 to delete data on database layer 105, etc. In some embodiments, a user additionally uses user system 130 to a log of user activity either directly or via database layer 105 or security system 135.

Administrator system 135 comprises an administrator system for use by an administrator. For example, administrator system 135 comprises a system for communication, data access, computation, etc. An administrator uses administrator system 135 to maintain database layer 105. For example, an administrator uses administrator system 135 to start and/or stop services on database layer 105, to reboot database layer 105, to install software on database layer 105, to add, modify, and/or remove data on database layer 105, etc. Administrator system 135 communicates with database layer 105, security layer 110, and/or business application layer 115 via a web-interface. For example, administrator system 135 communicates with database layer 105, security layer 110, and/or business application layer 115 via a web-browser installed on administrator system 135. As another example, administrator system 135 communicates with database layer 105, security layer 110, and/or business application layer 115 via an application running on administrator system 135. In some embodiments, an administrator (e.g., an administrator of a tenant associated with a dataset comprised in database layer 105) uses administrator system 135 to configure one or more security fields associated with fields in the data set (e.g., indexed fields of the dataset) and/or one or more security descriptors in the one or more security fields. The administrator may configure the security field(s) and/or security descriptor(s) to define or set a criteria or policy to be applied in connection with enforcing user access to information in the corresponding information field (e.g. the indexed fields). The criteria or policy to be applied may be based on a security policy of the tenant (e.g., a tenant-specific security policy). In some embodiments, the security field(s) and/or security descriptor(s) may be set in accordance with a default security policy (e.g., a default security policy of a service provider such as provider that hosts the dataset, or a default security policy of the tenant).

Application developer system 140 is used by application developers who provide data artifacts such as the data definition with security descriptors configured to the tenants. In some embodiments, for custom reports that are tenant configurable, this configuration is done by security administrators or tenant superusers.

Database layer 105 stores one or more datasets. In various embodiments, the one or more datasets comprise human resources data, financial data, organizational planning data, or any other appropriate data. In some embodiments, the database layer 105 stores one or more datasets for a plurality of tenants. For example, the database layer 105 hosts at least part of a software as a service (e.g., a database storing data for the service) for a plurality of tenants such as customers for a provider of the software as a service). In various embodiments, a tenant comprises an organization such as a company, a government entity, a sub-organization of an organization (e.g., a department), or any other appropriate organization. In some embodiments, database layer 105 stores one or more datasets comprising tenant sensitive or confidential information such as personally identifiable information (PII) (e.g., PII of a person associated with a tenant), etc. For example, database layer 105 comprises a database system for storing data in a table-based data structure, an object-based data structure, etc. In various embodiments, database layer 105 comprises a business database system, a human resources database system, a financial database system, a university database system, a medical database system, a manufacturing database system, or any other appropriate system. In some embodiments, database layer 105 comprises an object-oriented database system.

In some embodiments, a dataset comprised in database layer 105 comprises one or more information/data fields, such as fields that may correspond to indexed fields. The dataset may be configured such that one or more of the information/data fields respectively have a corresponding security field(s) or security descriptors (e.g., the security descriptors may be comprised in the corresponding security field(s)). Database layer 105 is configured to run a query against at least one dataset. For example, the database layer 105 may receive a query (e.g., a query string), determine information that is responsive to the query, and return at least a subset of the information that is responsive to the query (e.g., a predefined number of results, etc.). In some embodiments, database layer 105 is configured to receive a query in connection with one or more security predicates, and to determine information that is responsive based at least in part on both the query and the one or more security predicates. For example, database layer 105 may use the one or more security predicates in connection with further filtering results/information that is responsive to the query.

According to various embodiments, a user uses user system 130 to execute one or more tasks with respect to data (e.g., one or more datasets) stored on database layer 105. For example, a user inputs to user system 130 a query or request to execute a task (e.g., run a query against a dataset) at database layer 105, and database layer 105 receives the query or request to execute the task from user system 130 via network 120, etc. In response to receiving the query or request to execute the task, database layer 105 executes the task and provides a result to the user via user system 130. In some embodiments, the result comprises information or a set of information that is responsive to the query or execution of the task. In some embodiments, the result comprises a report including information that is responsive to the query or execution of the task or selectable elements (e.g., links such as hyperlinks) that point to information that is responsive to the query or execution of the task.

In some embodiments, an administrative user or another user (e.g., a permitted user) configures one or more datasets stored by database layer 105. For example, an administrative user inputs a setting to a security descriptor (e.g. the administrator defines a security descriptor to be enforced in restricting access to corresponding information such as based on a determination of whether a user satisfies a criteria or attribute of the security descriptor). The administrative user may define or set the security descriptor on a field-by-field basis (e.g., each indexed field in the dataset can have a unique corresponding setting or definition, or otherwise may be individually set/defined). In some implementations, the administrative user defines/sets the security descriptor for a plurality of fields to have the same setting/definition (e.g., similar types of fields may be set to have the same privileges defined/set in the security descriptor).

According to various embodiments, security layer 110 provide security with respect to database layer 105. For example, security layer 110 determines information (or a set of information, etc.) that a particular is permitted to access. As an example, security layer 110 determines whether a user has permission to access information based at least in part on a mapping of user permissions to information. As another example, security layer 110 determines whether a user has permission to access information based at least in part on a determination that an object corresponding to the information (e.g., to a piece of information or to a plurality of pieces of information) comprises an attribute or information indicating that the user has permission to access such object. In some embodiments, security layer 110 authenticates a user that is accessing database layer 105, or security layer 110 otherwise uses a credential associated with the user in connection with determining whether a user is permitted to perform a particular activity or to have access to certain information.

In some embodiments, security layer 110 obtains one or more user security privileges associated for a user. In response to receiving a user query, the system may determine a user associated with the user query. For example, the user query may include information associated with, or that identifies, the user such as a user identifier, a login identifier, etc. As another example, the user query may be input to the business application layer 115 such as via a web interface after the user has logged into an application or service (e.g., after the user has been authenticated). Accordingly, the user query may be input via the account for the user. Security layer 110 may determine a user profile associated with the user, and obtain the one or more user security privileges based at least in part on the user profile. For example, the one or more security privileges may be based at least in part on an attribute comprised in the user profile. The one or more security privileges may be used to determine one or more security predicates to use in connection with querying the database with respect to the user query. For example, a query string may be configured based at least in part on the user query and one or more security predicates. The one or more security predicates may indicate an attribute or privilege of the user associated with the user query, and database layer 105 may use the one or more security predicates in connection with determining whether the user has access to certain information stored in database layer 105 (e.g., information that is responsive to the user query). In some embodiments, security layer 110 configures a query string based at least in part on the user query. Security layer 110 may configure the query string to comprise the one or more security predicates. In some embodiments, security layer 110 provides the one or more security predicates to the business application layer 115, which configures or generates the query string and provides the query string to database layer 105. Various other layers may be used to generate the query string and/or determine the one or more security predicates to use in connection with the query string. In some embodiments, security layer 110 and business application layer 115 are comprised in a single layer.

In some embodiments, in response to execution of a task (e.g., running a task against a dataset in response to a user request to execute the task, performing a query against the log of user activity, etc.), database system 105 determines information responsive to execution of the task, and security layer 110 determines a subset of the information responsive to execution of the task for which the user associated with the request to execute the task/query has the requisite access permissions. In some embodiments, security layer 110 filters information and outputs only information that the requesting user is permitted to access.

In some embodiments, database layer 105, security layer 110, and business application layer 115 are implemented on a single server or a plurality of servers. For example, database layer 105, security layer 110, and business application layer 115 are different modules running on a same server or set of servers.

Figure 2:
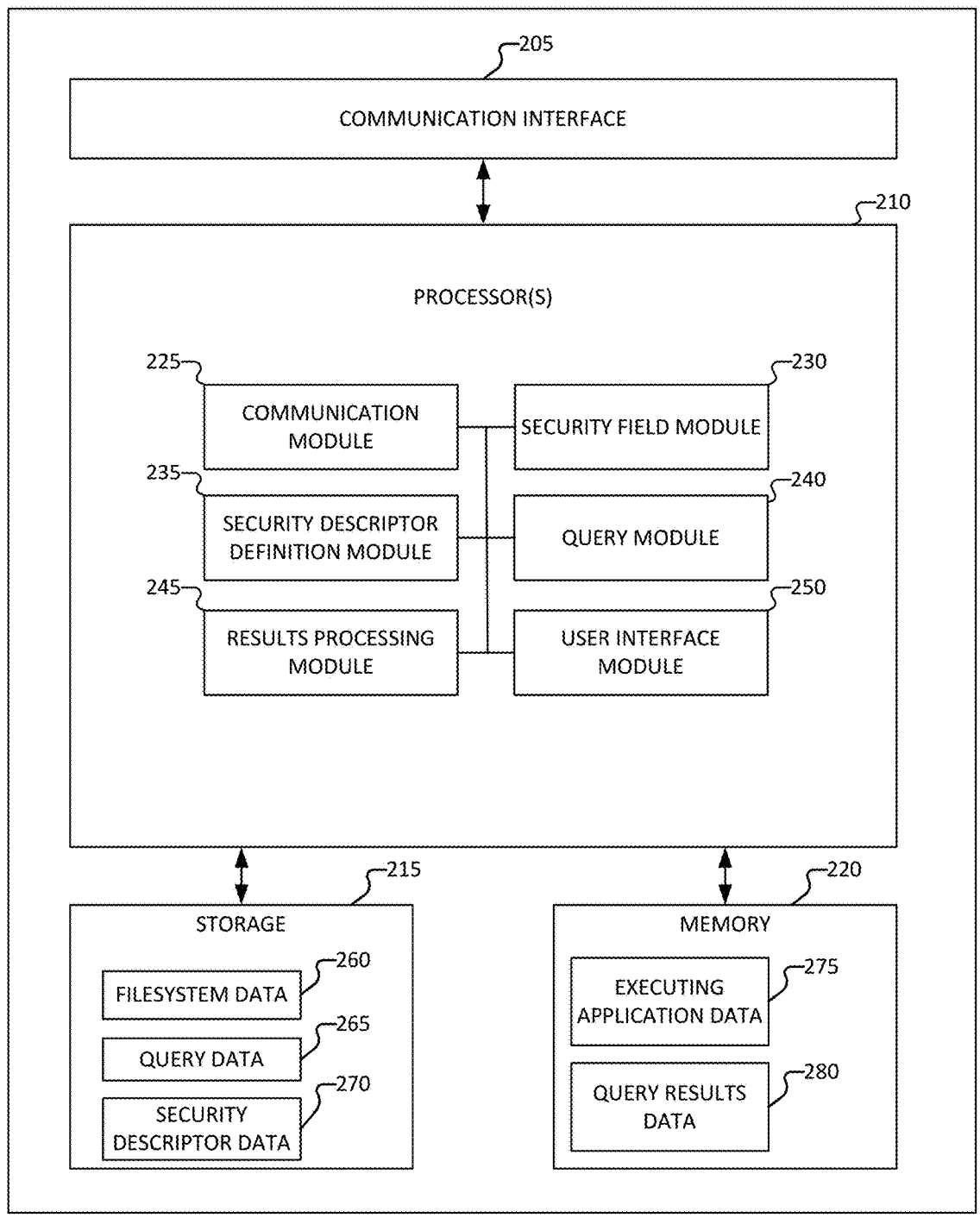
FIG. 2 is a block diagram of a database system according to various embodiments of the present application.

FIG. 2 is a block diagram of a system according to various embodiments of the present application. In some embodiments, system 200 comprises, or corresponds to, one or more of database layer 105, security layer 110, and business application layer 115 of system 100 of FIG. 1. System 200 may implement process 300 of FIG. 3, process 500 of FIG. 5, process 600 of FIG. 6, process 700 of FIG. 7, process 800 of FIG. 8, and/or process 900 of FIG. 9. System 200 may implement security descriptor 400 of FIG. 4.

In the example shown, system 200 implements one or more modules in connection with managing data in one or more datasets and/or enforcing security (e.g., user access permissions) with respect to the one or more datasets. System 200 comprises communication interface 205, one or more processors 210, storage 215, and/or memory 220. One or more processors 210 comprises one or more of communication module 225, task security field 230, security descriptor definition module 235, query module 240, results processing module 245, and/or user interface module 250.

In some embodiments, system 200 comprises communication module 225. System 200 uses communication module 225 to communicate with various client terminals or user systems such as user system 130 and/or administrator system 135. For example, communication module 225 provides to communication interface 205 information that is to be communicated. As another example, communication interface 205 provides to communication module 225 information received by system 200. Communication module 225 is configured to receive one or more queries or requests to execute tasks such as from various client terminals or user systems. The one or more queries or requests to execute tasks is with respect to information stored in one or more datasets. Communication module 225 is configured to provide to various client terminals or user systems information such as information that is responsive to one or more queries or tasks requested to be executed. In some embodiments, communication module 225 provides the information to the various client terminals or user systems information in the form of one or more reports (e.g., according to a predefined format or to a requested format), and/or via one or more users interfaces (e.g., an interface that user system 130 is caused to display).

In some embodiments, system 200 comprises security field module 230. According to various embodiments, security field module 230 is implemented in security layer 110 of FIG. 1. System 200 uses security field module 230 in connection with configuring and/or associating a security field with an information field (e.g., an indexed field). An administrator (e.g., an administrator associated with a tenant, or a service provider that hosts a dataset) may configure a dataset (e.g., a database) to include one or more security fields. According to various embodiments, the one or more security fields are used in connection with setting/defining access permissions for information comprised in one or more associated information fields. In some embodiments, an indexed field of a database comprises a single security field. According to various embodiments, system 200 enforces a default security policy if a security field is not configured for the indexed field and/or if the indexed field does not have an associated security field. A security field may be configured to comprise one or more security descriptors.

In some embodiments, system 200 comprises security descriptor definition module 235. Security descriptor definition module 235 sets one or more security descriptors for a security field comprised in a dataset (e.g., a database). The one or more security descriptors may include a value or criteria that is used to enforce security with respect to a part of a database. In some embodiments, the value or criteria comprised in (or corresponding to) a security descriptor is used as a filter in connection with returning results to a query for a database. According to various embodiments, a security descriptor is used in connection with filtering information that is responsive to a user query to return a subset of such responsive information that the user associated with the user query is permitted to access. Security descriptor definition module 235 may receive an input from a user and use the input to set/define one or more security descriptors for a security field. As an example, an administrator uses a web service or application via administrator system 135 to provide the user input to set/define the one or more security descriptors. Security descriptor definition module 235 may set/define one or more security descriptors for a security field according to a security policy such as a security policy associated with a corresponding tenant, or a default security policy. As an example, an administrator uses a web service or application via administrator system 135 to set a security policy that is to be used for a particular dataset or for a tenant's dataset(s).

In some embodiments, system 200 comprises query module 240. System 200 uses query module 240 to receive a query such as a user query. Query module 240 may receive a query from a user via communication interface 205. For example, a user inputs a query to user system 135, which communicates the query to business application layer 115 via network 120. According to various embodiments, the query (e.g., the user query) includes or indicates one or more parameters associated with a query to be run against one or more datasets. The user may input the query to a web service or application via user system 130. According to various embodiments, query module 240 determines a query string to be provided to a database layer to run a query against one or more datasets. Query module 240 may determine the query string based at least in part on the user query. According to various embodiments, query module 240 determines the query string based at least in part on the user query and one or more security predicates. The one or more security predicates may be determined based at least in part on an attribute associated with the user for which the query is to be executed (e.g., the user that input the user query). As an example, query module 240 obtains/determines the attribute from a user (e.g., an attribute of a user object or a data of a profile) associated with the user. As another example, query module 240 receives the attribute from a security module.

According to various embodiments, the one or more security predicates (e.g., used in connection with configuring the query string or running performing the query) correspond to security descriptors of database field (e.g., information fields or security fields associated with the information fields of a dataset in a database) that is associated with the user query (e.g., a database field that is invoked by the query such as a field comprising information that is at least partially responsive to the query). As an example, query module 240 (or other security module) selects the one or more security predicates to be used with the query string based at least in part on one or more database fields associated with the user query, or one or more security descriptors corresponding to such one or more database fields.

In some embodiments, query module 240 receives results associated with a query such as in response to the query being run against the one or more datasets. As an example, in response to receiving the results associated with the query, query module 240 provides the results to result processing module 245. As another example, in response to receiving the results associated with the query, query module 240 provides the results to the user such as to user system 130 via communication interface 205.

In some embodiments, system 200 comprises results processing module 245. System 200 uses results processing module 245 to process results associated with running query against one or more datasets. Results processing module 245 processes the results to obtain readable results (e.g., results that are readable to a human user on user system 130). Results processing module 245 may receive the results and translate the results to obtain readable results. As an example, results processing module 245 translates the results based at least in part on using a mapping between database fields (e.g., database fields from which information comprised in the results is obtained) and readable names. In some embodiments, results processing module 245 formats readable results to obtain results that are to be returned to the user. As an example, formatting the results comprises inserting one or more selectable links that respectively point to associated information. The one or more selectable links may correspond to information in the results that is formatted as a hyperlink to point to other information (e.g., to allow a user of the results to drill down within the results to see other related/associated information). As another example, formatting the results comprises populating one or more report templates with the results (e.g., the results to be returned to the user or the readable results).

In some embodiments, selection of the one or more selectable link (e.g., by a user via user system 130) invokes a query for the information underlying the pointer of the link (e.g., the information to which the selectable link points). In response to the query being invoked, the corresponding client terminal sends the query to system 200 (e.g., query module 245) and results for such a query may be processed by results. The use of a selectable link may allow a user of the results to drill down within the results to see other related/associated information. However, such related/associated information may have different a different security policy (e.g., different access permissions may be required). The querying generated in response to selection of the selectable link may also include configuring a query string for the query invoked by selection of the selectable link, including one or more security predicates determined for the user that selected the selectable link.

In some embodiments, system 200 comprises user interface module 250. System 200 uses user interface module 250 in connection with configuring information (or the display thereof) to be provided to the user such as via user system 130 and/or administrator system 135. User interface module 250 is implemented by database system 105 of system 100 of FIG. 1. In some embodiments, user interface module 250 configures a user interface to be displayed at a client terminal used by the user or administrator, such as an interface that is provided in a web browser at the client terminal. In some embodiments, user interface module 250 configures the information to be provided to the user such as configuring one or more reports of information that is responsive to a query or task executed with respect to database layer 105 (e.g., a query or task executed against one or more datasets).

According to various embodiments, storage 215 comprises one or more of filesystem data 260, query data 265, and/or security descriptor data 270. Storage 215 comprises a shared storage (e.g., a network storage system) and/or database data, and/or security data such as a security policy or security profile, including one or more security descriptors stored in a security field associated with an information field of the database data. In some embodiments, filesystem data s comprises a database such as one or more datasets (e.g., one or more datasets for one or more tenants, etc.). Filesystem data 260 comprises data such as a dataset for training a machine learning process, historical information pertaining user activity, a human resources database, a financial database, etc.). In some embodiments, query data 265 comprises information pertaining to a task or query being executed, historical information for tasks or queries that have been executed, information that is responsive to a query (e.g., results from an executed query), etc. In some embodiments, security descriptor data 270 comprises a security descriptor data comprises data pertaining to a security descriptor such as one or more descriptors associated with a security field of a dataset, etc.

According to various embodiments, memory 220 comprises executing application data 275 and query results data 280. Executing application data 275 comprises data obtained or used in connection with executing an application. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.). Query results data 280 comprises data that is responsive to a query (e.g., a user query) that is run against one or more datasets. The data comprised in query results data 280 may be information that is responsive to the user and one or more security predicates corresponding to the query (e.g., a user predicate associated with the user and communicated in connection with a query string for the user query). In some embodiments, query results data 280 comprises information pertaining to a report comprising results from a query, formatted results, readable results, etc.

Figure 3:
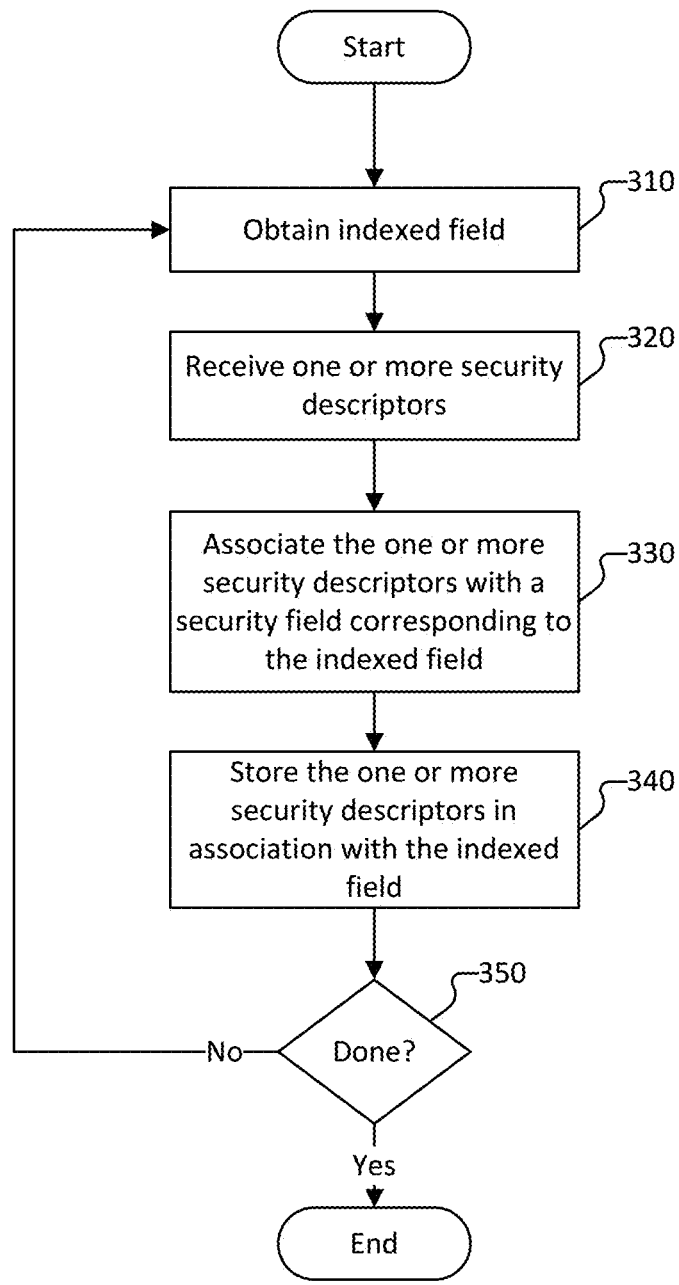
FIG. 3 is a flow diagram of a method for defining a security descriptor with respect to a database according to various embodiments of the present application.

FIG. 3 is a flow diagram of a method for defining a security descriptor with respect to a database according to various embodiments of the present application. In some embodiments, process 300 is implemented by at least part of system 100 of FIG. 1 and/or system 200 of FIG. 2. In some embodiments, process 300 is implemented in connection with generating security descriptor 400 of FIG. 4. According to various embodiments, process 300 is implemented by a security layer of a system that manages one or more datasets and/or a software as a service. For example, process 300 is implemented by security layer 110 of system 100 of FIG. 1.

At 310, an indexed field is obtained. According to various embodiments, the indexed field is obtained from a database layer or other subsystem that manages a dataset. As an example, the indexed field is an information field (e.g., data field) for a dataset.

In some embodiments, the obtaining the indexed field comprises receiving a selection of the indexed field from a user. As an example, the user selects the indexed field as a field for which the user desires to set/define a security policy or security privileges. Selection of the indexed field may be selection from a user interface from among a set of fields (e.g. the user interface may display a set of fields corresponding to a selected dataset, etc.).

In some embodiments, the indexed field is obtained in connection with an iterative process by which a system sets one or more security descriptors for indexed fields in a dataset. As an example, an administrator inputs a selection to run iterative process by which the system sets one or more security descriptors for indexed fields. The iterative process may include reading a mapping of security descriptors to indexed fields, determining the security descriptor(s) associated/mapped to an indexed field, and setting the security descriptor(s) in association with the indexed field.

At 320, one or more security descriptors are received. According to various embodiments, the one or more field descriptors are received in connection with setting/defining the security policy or security privileges for the indexed field.

In some embodiments, the one or more descriptors include a value or criteria that is used to enforce security with respect to a part of a database. In some embodiments, the database is configured to comprise a security field associated with an indexed field that stores information pertaining to a dataset. For example, the security field may store the one or more descriptors set/defined in association with the indexed field. Examples of a field descriptor include user role, title, location, office, cost center, department, sub-organization (within the tenant), identification that the user is a participant on a particular project, user identifier, level on a hierarchy within the tenant organization, etc.

In some embodiments, the one or more security descriptors are received from a user via a client terminal such as user system 130 and/or administrator system 135. For example, a user interface provided at the client terminal provides a list of available/possible security descriptors, and the user inputs selection of one or more security descriptors from among the security descriptors comprised in the list of available/possible security descriptors. As another example, the user adds/defines a security descriptor (e.g., adds a security descriptor that is not comprised in the list of available/possible security descriptors).

In some embodiments, the one or more security descriptors are obtained from a file. For example, the file corresponds to a security policy for a dataset, and the system analyzes the file to determine/extract a mapping of one or more security descriptors to indexed fields. As an example, the file is uploaded to the system by a user such as an administrator associated with the tenant. In some embodiments, in response to the system determining that the security policy does not define at least one security descriptor that is mapped to the indexed field, the system determines to apply a default security descriptor for the indexed field. As an example, the system may apply a default security policy (e.g., use one or more default security descriptors in association with an indexed field) in response to a determination that a system hosted/provided for the tenant has a default security setting enabled. In some embodiments, the default security policy for an indexed field is no security. In various embodiments, the default security policy for an indexed filed is a read-only security, no access allowed security, read access security, write security, edit security, delete security, or any other appropriate security.

At 330, the one or more security descriptors are associated with a security field corresponding to the indexed field. According to various embodiments, in response to receiving the one or more security descriptors, the one or more security descriptors are associated with the indexed field. For example, a security field associated with the indexed field is populated with the one or more security descriptors.

At 340, the one or more security descriptors are stored in association with the indexed field. In some embodiments, the one or more descriptors are stored in the corresponding security field.

At 350, a determination is made as to whether 300 is complete. In some embodiments, process 300 is determined to be complete in response to a determination that the user has indicated that no further field descriptors are to be set or defined with respect to an indexed field, the user has exited the system, or an administrator indicates that process 300 is to be paused or stopped. In response to a determination that process 300 is complete, process 300 ends. In response to a determination that process 300 is not complete, process 300 returns to 310.

Figure 4:
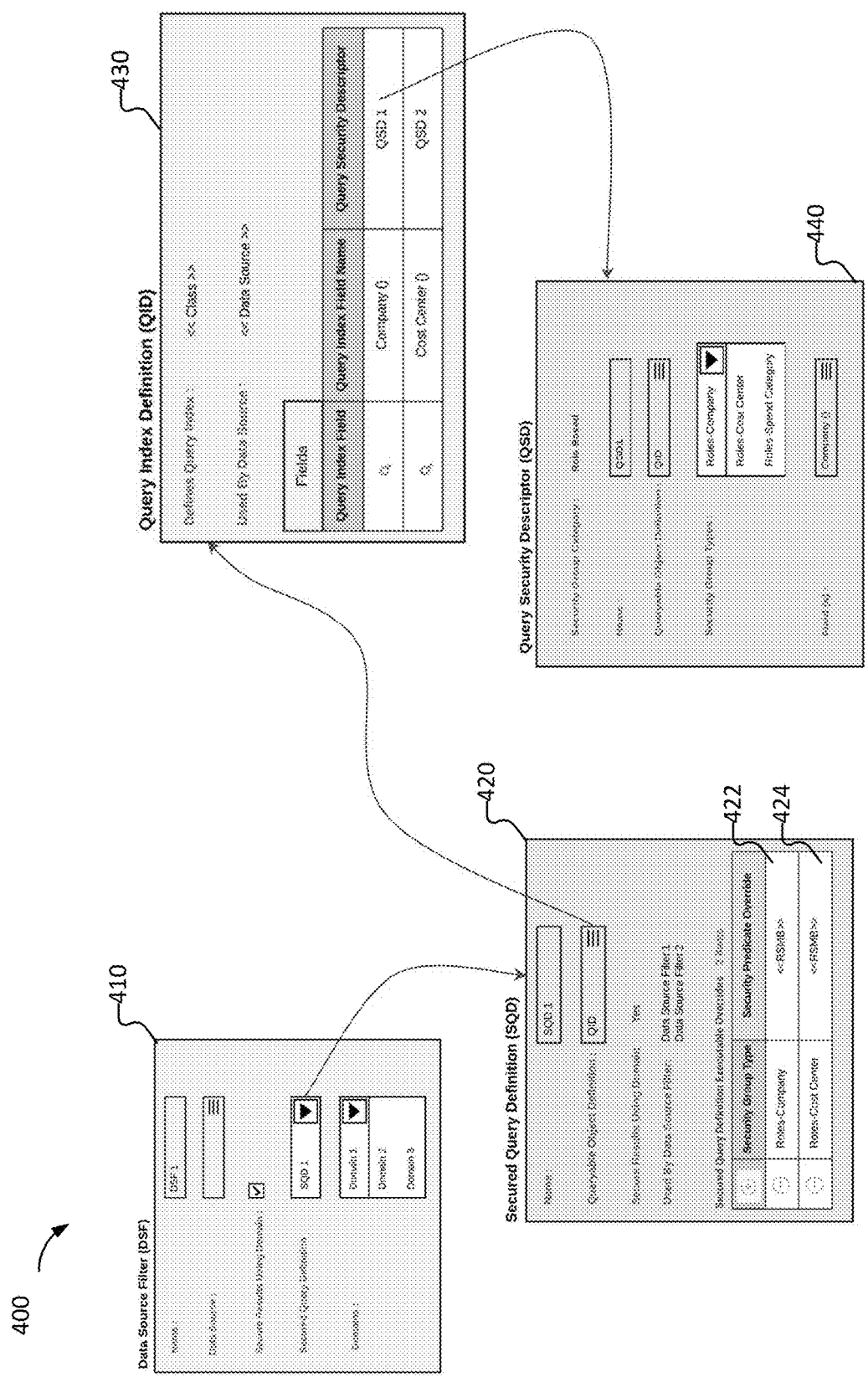
FIG. 4 is a diagram of a security descriptor used in connection with an indexed field for a database according to various embodiments of the present application.

FIG. 4 is diagram illustrating an embodiment of a security descriptor configuration interface presented at a client terminal. In the example shown, a user (e.g., an administrator, tenant superuser, application developer, etc.) is able to use the interface to select a data source, a data source filter, and security configuration such as security domains, security group types, and security descriptors that can be attached to the dataset definition. In some embodiments, once the security descriptors are identified and configured on the dataset, process 500 described in FIG. 5 can start executing the query.

Interface 410 is presented to the user at a client terminal. A user (e.g., an administrator, tenant superuser, application developer, etc.) uses the interface to select a data source or a data source filter with security definition attached to it that corresponds to security domains configured on the dataset. The security domains provide configurable options to the tenants to specify the security group policies such as roles as illustrated in optional security predicates 422 (e.g., security group type: 'roles-company' indicating company roles with security predicate override '<<RSMB>>') and optional security predicate 424 (e.g., security group type: 'roles-cost center' indicating cost center roles with security predicate override '<<RSMB>>'). Secured query definition interface 420 presents an option of how to secure the data using a queryable object definition (e.g., query index definition interface 430). For instance, secure results indicate the data should be secured contextually using the security descriptors configured under query index definition interface 430 and query security descriptor interface 440.

Secured query definition interface 420 comprises elements with which the user configures a query, including optional security predicate 422 and optional security predicate 424 (e.g., a security group type and a security predicate override) that can be attached to the dynamic runtime security predicate (such as in 520), an indication of a dataset to be queried, etc. The security predicates provide an additional flexibility for the user to override the default security evaluation. For instance, if user provides a value when executing the query, the security framework of the system is smart enough to validate only the input values rather than evaluating all the instances of the securing field using security overrides. This will enhance the performance of the query drastically. Secured query definition interface 420 connects the security predicates to query index definition interface 430, which includes the query index definition.

Query index definition interface 430 comprises an indication of an index definition of a dataset. Query index definition interface 430 comprises one or more security descriptors associated with index fields and index field names of the dataset. For instance if the query index field "company" is configured as a security descriptor, this would indicate that any instance of the query definition needs to be secured based on the company security profile as illustrated in query security descriptor interface 440. The typical fields used for security descriptors include company, cost center, location, supervisory organization, etc.

Query security descriptor interface 440 corresponds to an interface via which a security descriptor is defined for an index in query index definition interface 430. The security descriptor definition indicates a criterion by which security is enforced (e.g., a role of the user, a cost center, a spend category, a department, etc.). Query security descriptor interface 440 provides elements by which the user defines the parameter/criteria to be applied for enforcement of security on a defined/selected index field (e.g., a security group type for a security descriptor). The security group type is either a role or an attribute that describes how security should be enforced for the underlying security group. The security descriptor configured is stored on the query index field.

In some embodiments, the one or more security descriptors are obtained from query definition or search definition or via security policies as shown in secured query definition interface 420. The security descriptors attached to the query fields would serve as filters for building the security predicates based on the query definition through which the data is filtered for enforcement of security.

In various embodiments, security groups comprise one or more of the following: self-service security groups (e.g., employee-as-self, student-as-self, etc.); unconstrained security groups (e.g., all managers, security administrators, etc.); role-based constrained security groups (e.g., manager, accountant, etc.); segment-based constrained groups (e.g., benefits partner, absence partner, etc.); level-based constrained security groups (e.g., manager level, compensation level, etc.), or any other appropriate group.

In some embodiments, the security predicate generation is dependent on the security group type. For instance, for role-based security groups, the hierarchy of an organization is traversed and from this traversal, it is determined what roles are configured. For another example, for segment-based groups, the configured data segments are examined to generate predicates.

Figure 5:
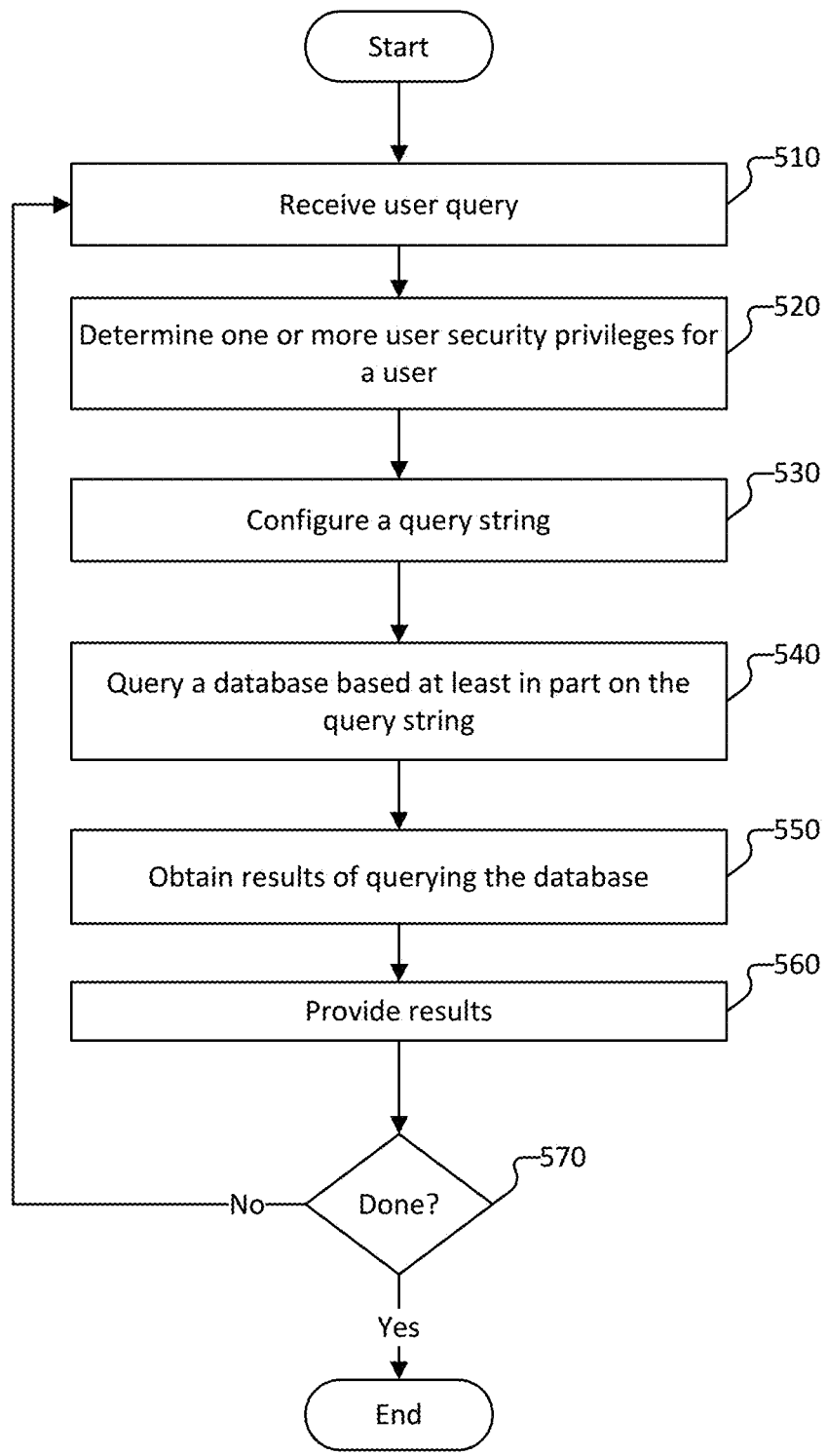
FIG. 5 is a flow diagram of a method for querying a database system according to various embodiments of the present application.

FIG. 5 is a flow diagram of a method for querying a database system according to various embodiments of the present application. In some embodiments, process 500 is implemented by at least part of system 100 of FIG. 1 and/or system 200 of FIG. 2. In some embodiments, process 500 is implemented in connection with using a security descriptor such as security descriptor 400 of FIG. 4 in connection with enforcing security. According to various embodiments, process 500 is implemented by a security layer or a query layer (e.g., a business application layer) of a system that manages one or more datasets and/or a software as a service. For example, process 500 is implemented by security layer 110 and/or business application layer 115 of system 100 of FIG. 1.

At 510, a user query is received. According to various embodiments, the user query is received from a client terminal such as user system 130 of system 100 of FIG. 1. As an example, the user query is received via communication interface 205 and/or communication module 225. In some embodiments, the user query is input by a user such as to a client terminal.

According to various embodiments, the user query comprises one or more parameters such as one or more parameters to be used in connection with running a query against one or more datasets such as a database comprised in database layer 105 of system 100 of FIG. 1. As an example, at least part of the one or more parameters are input by the user. In some implementations, a subset of the one or more parameters are preconfigured. For example, a subset of the one or more parameters are configured for the tenant, such as an identifier of the dataset. As another example, a subset of the one or more parameters are configured based at least in part on an application in which the user is submitting the query, a menu or interface in which the user is submitting the query, and the like.

According to various embodiments, information pertaining to the user that input the query (or for whom the query is to be run) is received in connection with the user query. As an example, the user query comprises a user identifier associated with the user. As another example, the system obtains a user identifier in response to receiving the user query, such as based on a user account via which the query is provided to the system.

At 520, one or more user security privileges for a user are determined. According to various embodiments, in response to receiving the user query, the system determines the one or more user security privileges for the user associated with the user query. As an example, the one or more user security privileges are determined based at least in part on a user profile associated with the user. As another example, the one or more user security privileges are determined based at least in part on one or more attributes associated with the user (e.g., attributes of a user object in an object database). As another example, the one or more user security privileges are determined based at least in part on a mapping of user privileges to users and/or a mapping of attributes to users. In some embodiments, the system determines the one or more user security privileges based at least in part on an indication of the user associated with the user query, such as a user identifier comprised in, or communicated/obtained in connection with, the user query.

According to various embodiments, the user security privileges are used in connection with determining access permissions for the user. For example, the system determines whether to permit access to certain information based at least in part on a determination or indication that the user has the applicable user access permissions for such information.

Examples of one or more attributes associated with the user include user role, title, location, office, cost center, department, sub-organization (within the tenant), identification that the user is a participant on a particular project, user identifier, level on a hierarchy within the tenant organization, etc. Various other attributes may be comprised in the user profile or otherwise associated with the user.

At 530, a query string is configured. In some embodiments, the system configures the query string based at least in part on the user query and the one or more user security privileges. According to some embodiments, the system determines the query string based at least in part on one or more parameters (e.g., query parameters) associated with the user query and one or more user access privileges for the user associated with the user query.

According to various embodiments, the query string is configured by the security layer or the business application layer. Various other layers may configure the query string. In response to the query string being configured, the query string is provided (e.g., communicated) to the database (e.g., the database layer 105 of system 100 of FIG. 1). In some embodiments, communication of the query string to the database in connection with an indication of the one or more applicable user security privileges (e.g., via the one or more security predicates) pushes the enforcement of security of user access permissions with respect to information stored in the database to the database (e.g., the database layer). For example, the communication of the indication of the one or more applicable user security privileges (e.g., via the one or more security predicates) to the database is to provide the database with sufficient information to return as a result to the user query only such information for which the user has the requisite/applicable user access permissions.

According to one or more embodiments, the query string is configured to include one or more security predicates. For example, the configuring the query string comprises determining, by the system such as the security layer or business application layer, the one or more security predicates. In some embodiments, the one or more security predicates indicate an attribute or privilege of the user associated with the user query. The database layer uses the one or more security predicates in connection with determining whether the user has access to certain information stored in database layer. In some embodiments, the one or more security predicates comprise the one or more security privileges formatted or provided in a manner that is consistent with a predefined syntax for querying the database.

At 540, a database is queried based at least in part on the query string. According to various embodiments, in response to configuring or obtaining the query string, the system queries the database based at least in part on the query string. The business application layer or security layer provides to the database layer the query string (e.g., including the one or more security predicates). The database is queried for information that is responsive to the user query and the one or more security predicates. For example, the database is queried for information that is consistent with (e.g., satisfies) criteria or parameters associated with the user query and for which the user associated with the user query has sufficient access privileges. In some embodiments, the system (e.g., the database layer) determines whether the user has sufficient access privileges with respect to certain information based at least in part on the security descriptor associated with such information and the one or more security predicates communicated in connection with the user query. For example, the database layer may determine whether at least one of the one or more security predicates match at least one security descriptor associated with the information, or whether the one or more security predicates and the security descriptor(s) is consistent with permitted access to the information (e.g., database entry).

At 550, results associated with querying the database are obtained. According to various embodiments, in response to querying the database, the database layer provides the results to the system (e.g., the security layer and/or the business application layer). The results include at least part of the information that the database layer determines is responsive to the user query and for which the user has the applicable access privileges or permissions. In some embodiments, information for which the user does not have sufficient security/access privileges is not included in the results obtained from (or provided by) the database layer.

At 560, the results are provided. According to various embodiments, in response to receiving the results from the database (e.g., the database layer), the business application layer provides at least part of the results to the user. For example, business application layer 115 provides the results to a client terminal such as user system 130. The results may be provided via a web service (e.g., via a page in a web browser) or an application running on the client terminal.

According to various embodiments, the business application layer processes the results obtained from the database layer before providing to the user results that are responsive to the user query. In some embodiments, the processing of the results obtained from the database layer includes translating the results to a readable format and/or formatting the results such as formatting the readable results to obtain the results to be returned to the user.

In some embodiments, translating the results to obtain readable results comprises using a business application layer (e.g., a business intelligence layer) mapping between database fields and readable names. For example, the results obtained from the database layer include data in raw data format (e.g., without indexing, in a manner that is not readable/understandable by a human user, etc.). The business intelligence layer may thus appropriately index/key the results to obtain readable results.

In some embodiments, the formatting the results to obtain results to be provided to the user includes configuring the results according to a predefined format. For example, the business application layer populates a predefined report template with at least a subset of results. The subset of results can correspond to a preset number of results, such as the first one hundred results, or the set of results determined by the business application layer to be most relevant, etc. As another example, the formatting the results includes inserting a link within the results to be returned to the user. The link can be a selectable link such as a hyperlinked part of the results that points to another piece of information to which the user is directed (or for which a query is generated) in response to selection of the selectable link.

At 570, a determination is made as to whether 500 is complete. In some embodiments, process 500 is determined to be complete in response to a determination that the user has indicated that no query is to be input, the user has exited the system, or an administrator indicates that process 500 is to be paused or stopped. In response to a determination that process 500 is complete, process 500 ends. In response to a determination that process 500 is not complete, process 500 returns to 510. In some embodiments, the system determines that process 500 is not complete in response to a user selecting a selectable link comprised in the results. For example, selection of the selectable link can invoke a new query corresponding to the information underlying (pointed to by) the pointer/selectable link.

Figure 6:
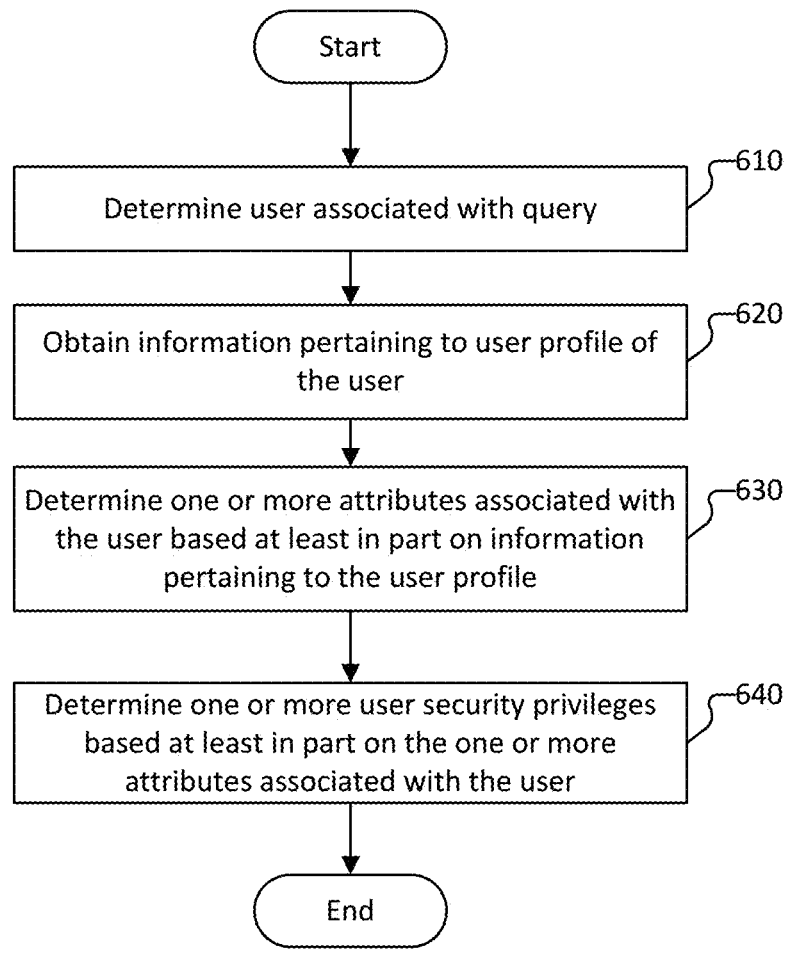
FIG. 6 is a flow diagram of a method for determining security privileges in connection with querying a database according to various embodiments of the present application.

FIG. 6 is a flow diagram of a method for determining security privileges in connection with querying a database according to various embodiments of the present application. In some embodiments, process 600 is implemented in connection with 520 of process 500 of FIG. 5.

At 610, a user associated with the query is determined. In some embodiments, in response to receiving a query (e.g., a user query), the system (e.g., the business application layer) determines the user associated with the query.

According to various embodiments, the user query comprises one or more parameters such as one or more parameters to be used in connection with running a query against one or more datasets such as a database comprised in database layer 105 of system 100 of FIG. 1. As an example, at least part of the one or more parameters are input by the user. In some implementations, a subset of the one or more parameters are preconfigured. For example, a subset of the one or more parameters are configured for the tenant, such as an identifier of the dataset. As another example, a subset of the one or more parameters are configured based at least in part on an application in which the user is submitting the query, a menu or interface in which the user is submitting the query, and the like.

According to various embodiments, information pertaining to the user that input the query (or for whom the query is to be run) is received in connection with the user query. As an example, the user query comprises a user identifier associated with the user. As another example, the system obtains a user identifier in response to receiving the user query, such as based on a user account via which the query is provided to the system.

At 620, information pertaining to the user profile of the user is obtained. According to various embodiments, in response to determining the user associated with the query, the system obtains information pertaining to the user profile of the user. As an example, the system determines, or otherwise looks up, a user profile of the user based on an identifier associated with the user such as a user id, a login id, an account number, etc. In some embodiments, the obtaining the information pertaining to the user profile comprises performing a lookup with respect to a mapping of user identifiers to users. In some embodiments, the obtaining the information pertaining to the user profile of the user comprises obtaining a mapping of one or more attributes to users.

At 630, one or more attributes associated with the user are determined based at least in part on information pertaining to the user profile. In some embodiments, the one or more attributes associated with the user are obtained from a mapping of one or more attributes to users. The one or more attributes associated with the user that are determined are further based at least in part on the query. For example, the system determines one or more data fields that are to be invoked/searched in connection with the query, and determines security descriptors or attributes that are used to assess whether the user has sufficient access privileges for the one or more data fields. In response to determining the security descriptors or attributes that are used to assess whether the user has sufficient access privileges for the one or more data fields, the system determines the corresponding one or more attributes associated with the user. As an example, if a security descriptor associated with an employee compensation data field is a role of the user querying the data field, the system determines the applicable role attributes for the user based at least in part on the user profile or a mapping of attributes to users.

Examples of one or more attributes associated with the user include user role, title, location, office, cost center, department, sub-organization (within the tenant), identification that the user is a participant on a particular project, user identifier, level on a hierarchy within the tenant organization, etc. Various other attributes may be comprised in the user profile or otherwise associated with the user.

At 640, one or more user security privileges are determined based at least in part on the one or more attributes associated with the user. As an example, the one or more user security privileges are determined based at least in part on a user profile associated with the user. As another example, the one or more user security privileges are determined based at least in part on one or more attributes associated with the user. As another example, the one or more user security privileges are determined based at least in part on a mapping of user privileges to users and/or a mapping of attributes to users. In some embodiments, the system determines the one or more user security privileges based at least in part on an indication of the user associated with the user query, such as a user identifier comprised in, or communicated/obtained in connection with, the user query.

Figure 7:
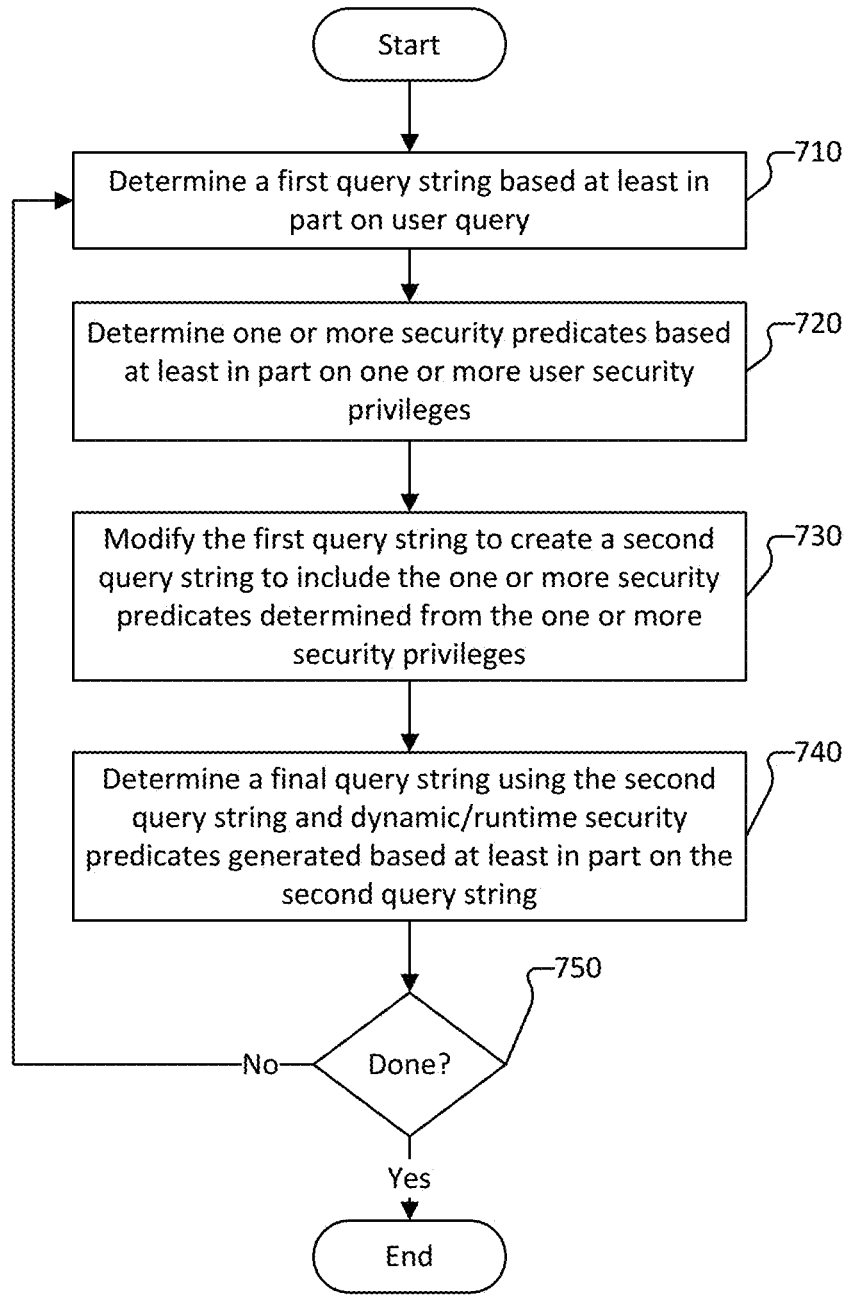
FIG. 7 is a flow diagram of a method for determining a query string for querying a database system according to various embodiments of the present application.

FIG. 7 is a flow diagram of a method for determining a query string for querying a database system according to various embodiments of the present application. Process 700 is implemented in connection with querying a database. In some embodiments, process 700 is implemented in connection with 530 of process 500 of FIG. 5.

At 710, a first query string is determined based at least in part on a user query. In some embodiments, the system determines the first query string based at least in part on one or more parameters associated with a query to be run against one or more datasets. According to various embodiments, the first query string is determined in a manner that a database is queried to return information that is responsive to the user query. The first query string may include at least a subset of the one or more parameters associated with the query, and the first query string is configured based at least in part on a predefined syntax associated with querying the intended database, etc.

As an example, at least part of the one or more parameters are input by the user. In some implementations, a subset of the one or more parameters are preconfigured. For example, a subset of the one or more parameters are configured for the tenant, such as an identifier of the dataset. As another example, a subset of the one or more parameters are configured based at least in part on an application in which the user is submitting the query, a menu or interface in which the user is submitting the query, and the like.

At 720, one or more security predicates based at least in part on one or more use security privileges. According to various embodiments, the system uses the one or more security privileges to determine one or more security predicates that are to be used in connection with querying the database with respect to the user query. As an example, the one or more security predicates indicate an attribute or privilege of the user associated with the user query, and database layer 105 uses the one or more security predicates in connection with determining whether the user has access to certain information stored in database layer 105 (e.g., information that is responsive to the user query).

At 730, the first query string is modified to create a second query string to include the one or more security predicates determined from the one or more security privileges. For example, the security predicates are attached and query is modified/rewritten to include the newly generated security predicates from 720. In some embodiments, a second query string is determined based at least in part on the one or more security predicates. According to various embodiments, the second query string is determined in a manner that a database is queried to return information for which the user has sufficient or applicable user access privileges. The second query string may include at least a subset of the one or more parameters associated with the query, and the second query string is configured based at least in part on a predefined syntax associated with querying the intended database, etc.

At 740, a final query string is determined using the second query string and dynamic/runtime security predicates generated based at least in part on the second query string. For example, the query string is determined based at least in part on a combination of one or more security privileges of user (720) and the dynamic/runtime security predicates generated and attached to the query based on the security privileges of user (730). In some embodiments, the query string is determined based at least in part on the first query string and second query string such that the database is queried for information that (i) is responsive to the user query, and (ii) the user associated with the user query has sufficient or applicable access privileges (e.g., the user is permitted to access the information being queried by/responsive to the user query).

According to various embodiments, the query string is constructed using the first query string and second query string. As an example, the system generates or configures the query string according to a predefined syntax associated with querying the intended database. For example, the first query string and the second query string is combined to derive the query string or at least part of the query string.

In some embodiments, the process further selects a next query string or part of the query string and determines one or more security predicates based on one or more user security privileges and there is a determination whether there are more query strings or parts of the query string to process-if so, continue to a next part, if not, go to 750.

At 750, a determination is made as to whether 700 is complete. In some embodiments, process 700 is determined to be complete in response to a determination that the user has indicated that no query is to be input, the user has exited the system, or an administrator indicates that process 700 is to be paused or stopped. In response to a determination that process 700 is complete, process 700 ends. In response to a determination that process 700 is not complete, process 700 returns to 710. In some embodiments, the system determines that process 700 is not complete in response to a determination that additional query strings are to be determined. For example, selection of the selectable link can invoke a new query corresponding to the information underlying (pointed to by) the pointer/selectable link. As another example, the system determines that process 700 is not complete in response to determining that a new query is input. As another example, the system determines that process 700 is not complete in response to determining that the user query comprises a plurality of queries to one or more databases, and additional query string(s) are to be configured for the plurality of queries.

Figure 8:
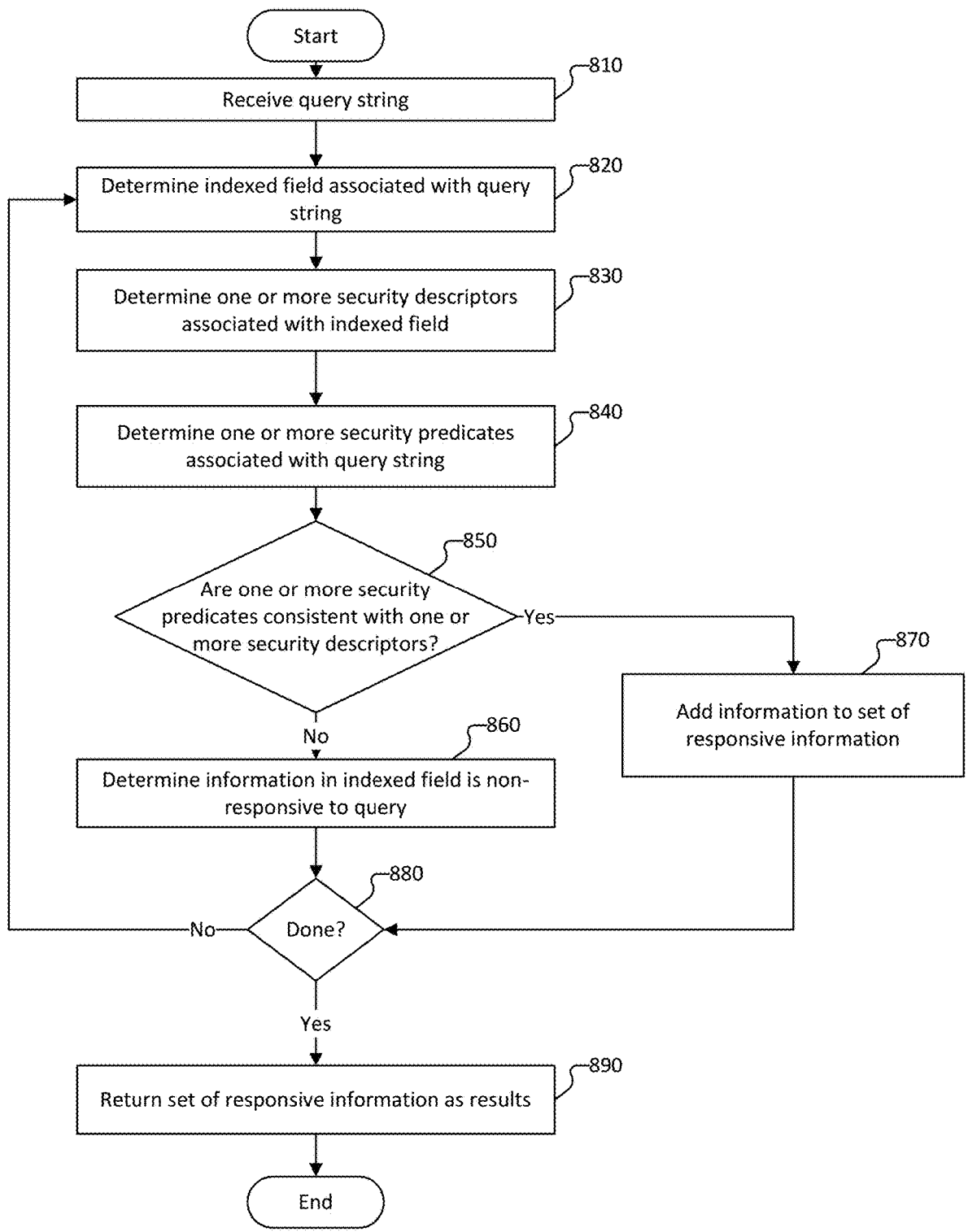
FIG. 8 is a flow diagram of a method for running a query according to various embodiments of the present application.

FIG. 8 is a flow diagram of a method for running a query according to various embodiments of the present application. According to various embodiments, process 800 is implemented by a database layer such as database layer 105 of system 100 of FIG. 1. Process 800 may be implemented by system 100 of FIG. 1 and/or system 200 of FIG. 2. Process 800 may be implemented in connection with process 500 of FIG. 5.

At 810, a query string is received. In some embodiments, the database layer receives the query string. As an example, the database layer receives the query string from another system layer such as a security layer or a business application layer. According to various embodiments, the query string comprises parameters associated with the user query (e.g., parameters that may be used as a filter to obtain information that is responsive to the user query) and parameters associated with security privileges (e.g., security predicates that may be used as a filter to obtain information that the user is permitted to access such as according to a tenant's security policy, which may be manifested as security descriptors associated with an indexed field).

At 820, an indexed field associated with a query string is determined. In some embodiments, the system (e.g., database layer) determines an indexed field that is invoked, or otherwise responsive to, at least part of the query string. For example, the database layer deconstructs the query string, determines one or more parameters from or based at least in part on the query string, and determines an indexed field that comprises information that is associated with at least one of the one or more parameters (e.g., information that may be responsive to the parameter).

At 830, one or more security descriptors associated with the indexed field are determined. In some embodiments, the database layer determines the one or more descriptors associated with the indexed field based at least in part on the security field associated with (e.g., mapped to) the indexed field. For example, the database layer determines a value (e.g., security descriptor) comprised in the security field(s) associated with the indexed field.

At 840, one or more security predicates associated with the query string are determined. According to various embodiments, the database layer obtains one or more security predicates from the query string. For example, the database layer deconstructs the query (or analyzes the query) and determines the one or more security predicates associated with the user. As an example, the database layer extracts the one or more security predicates from the query string based at least in part on a predefined syntax according to which a query string is formatted to be used to run a query against the database.

At 850, it is determined whether one or more security predicates are consistent with the one or more security descriptors. For example, initial security predicates are computed based of security descriptors and then the system validates whether all the security predicates are valid/applicable for the query given the user profile. In some embodiments, in response to determining the one or more predicates and the one or more security descriptors, the database layer determines whether the one or more predicates and the one or more security descriptors match. For example, the database layer determines whether the one or more predicates and the one or more security descriptors are consistent with consistent with permitted access to the corresponding database entry (e.g., the indexed field or the information comprised in the indexed field).

In response to a determination that the one or more predicates are not consistent with the one or more security descriptors at 850, at 860, information in the corresponding indexed field is determined to be non-responsive to the query. Process 800 then proceeds to 880.

In response to a determination that the one or more predicates are consistent with the one or more security descriptors at 850, at 870, the corresponding information is added to a set of responsive information. Process 800 then proceeds to 880.

At 880, a determination is made as to whether the determining of information responsive to the query string is complete. In some embodiments, the determining of information responsive to the query string is complete is determined to be complete in response to a determination that the user has indicated that no query is to be input, the user has exited the system, an administrator indicates that process 800 is to be paused or stopped. In some embodiments, the determining of information responsive to the query string is determined to be complete if the database (e.g., database layer) has iterated over all indexed fields invoked by, or responsive to, the user query (e.g., the query string). In response to a determination that the determining of information responsive to the query string is complete, process 800 proceeds to 890. In response to a determination that the determining of information responsive to the query string is not complete, process 800 returns to 820. In some embodiments, the system determines that process 800 is not complete in response to a user selecting a selectable link comprised in the results. For example, selection of the selectable link can invoke a new query corresponding to the information underlying (pointed to by) the pointer/selectable link.

At 890, the set of information that is responsive is returned as results. In some embodiments, in response to determining the set of information that is responsive is returned as results by the database layer to the business application layer. In response to the business application layer receiving the results from the database layer, the business application layer processes the results to provide results to the user (e.g., the user associated with the user query).

Figure 9:
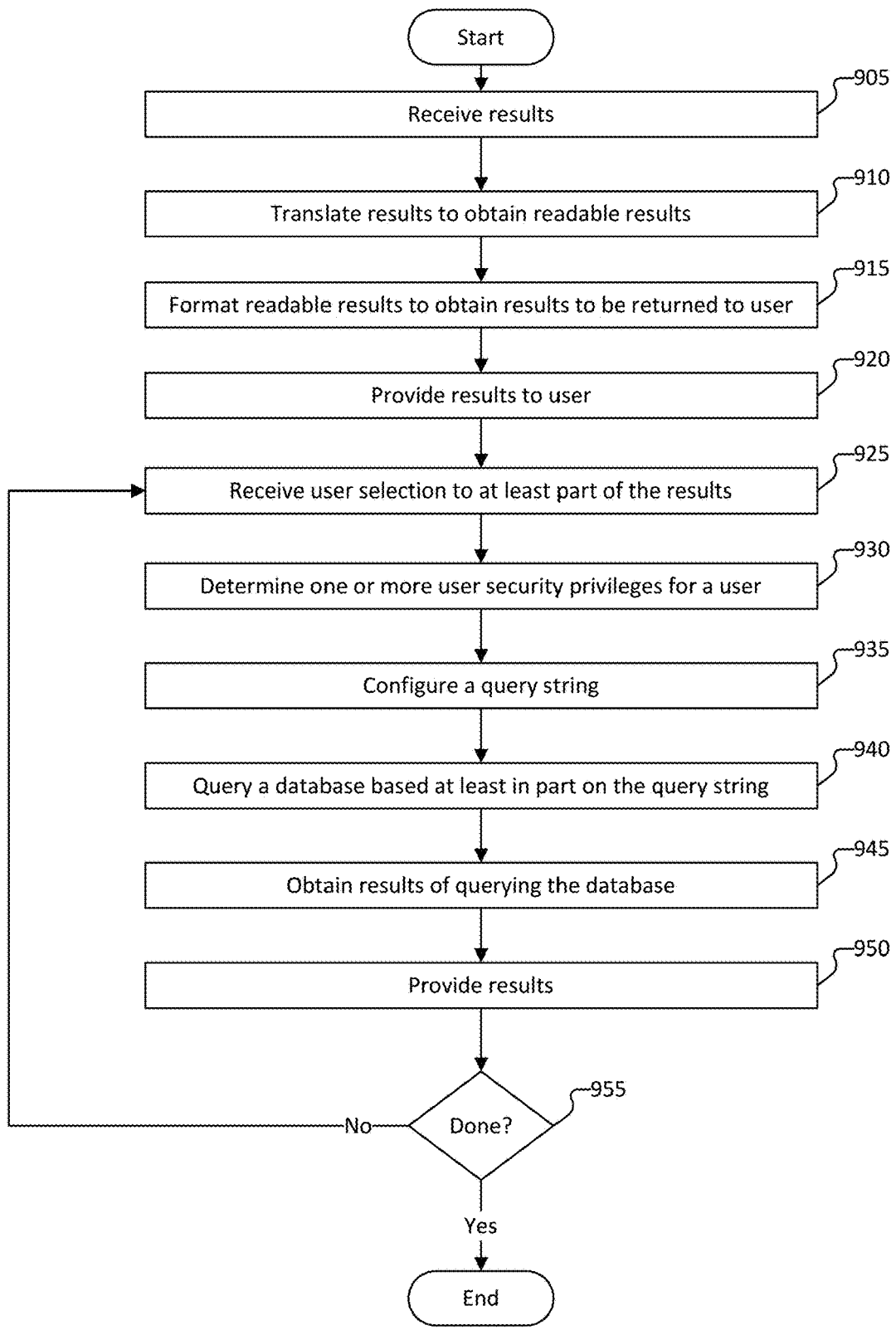
FIG. 9 is a flow diagram of a method for querying a database according to various embodiments of the present application.

FIG. 9 is a flow diagram of a method for querying a database according to various embodiments of the present application. In some embodiments, process 900 is implemented by at least part of system 100 of FIG. 1 and/or system 200 of FIG. 2. In some embodiments, process 900 is implemented in connection with processing results that are returned from a database layer based at least in part on a security descriptor such as security descriptor 400 of FIG. 4.

According to various embodiments, process 900 is implemented by a business application layer of a system that manages one or more datasets and/or a software as a service. For example, process 900 is implemented by business application layer 115 of system 100 of FIG. 1.

At 905, results are received. According to various embodiments, the system, such as a business application layer, receives results associated with running a user query against one or more datasets. As an example, the system receives the results from a database layer.

At 910, results are translated to obtain readable results. In some embodiments, the system translates the results from raw data to results that are readable/useable by a user. In some embodiments, the system translates the results based at least in part on using a mapping between database fields (e.g., database fields from which information comprised in the results is obtained) and readable names.

At 915, readable results are formatted to obtain results to be returned to a user. In some embodiments, the system formats the readable results to a format according to which the results are to be presented to a user associated with the query. As an example, the format is a predefined format, such as a report template.

In some embodiments, the system formats the readable results to obtain results that are to be returned to the user. As an example, formatting the results comprises inserting one or more selectable links that respectively point to associated information. The one or more selectable links correspond to information in the results that is formatted as a hyperlink to point to other information (e.g., to allow a user of the results to drill down within the results to see other related/associated information). As another example, formatting the results comprises populating one or more report templates with the results (e.g., the results to be returned to the user or the readable results).

At 920, results are provided to the user. In some embodiments, the results are communicated to a client terminal such as user system 130. As an example, the system causes the client terminal to display the results.

At 925, a user selection with respect to at least part of the results is received. In some embodiments, the system receives input from the client terminal. As an example, the input corresponds to a query from the user with respect to information comprised in the results. As another example, the input corresponds to a selection of a selectable link comprised in the results. Selection of the selectable link causes a query to be generated for information associated with the information pertaining to the selectable link. According to various embodiments, the user selection corresponds to a user drilling down on a specific part of the results.

At 930, one or more user security privileges for a user are determined. In some embodiments, the system determines the one or more security privileges associated with the user from whom the user selection is received. As an example, the one or more user security privileges are determined in a manner similar to 520 of process 500 of FIG. 5.

At 935, a query string is configured. In some embodiments, the system configures the query string based at least in part on the query (e.g., the selection of the selectable link) and the one or more use security privileges. As an example, the query string is configured in a manner similar to 530 of process 500 of FIG. 5.

At 940, a database is queried based at least in part on the query string. In some embodiments, the system queries the database in a manner similar to 540 of process 500 of FIG. 5.

At 945, results of querying the database are obtained. In some embodiments, the results of querying the database are obtained in a manner similar to 550 of process 500 of FIG. 5.

At 950, results are provided. In some embodiments, the results are provided in a manner similar to 560 of process 500 of FIG. 5.

At 955, a determination is made as to whether 900 is complete. In some embodiments, process 900 is determined to be complete in response to a determination that the user has indicated that no query is to be input, the user has exited the system, or an administrator indicates that process 900 is to be paused or stopped. In response to a determination that process 900 is complete, process 900 ends. In response to a determination that process 900 is not complete, process 900 returns to 925. In some embodiments, the system determines that process 900 is not complete in response to a user selecting a selectable link comprised in the results. For example, selection of the selectable link can invoke a new query corresponding to the information underlying (pointed to by) the pointer/selectable link.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a system layer configured to:
    receive a query; and
    modify the query to comprise one or more security predicates; and
  a database configured to:
    receive the modified query from the system layer;
    determine data to return in response to the modified query, wherein determining the data to return comprises extracting the one or more security predicates from the modified query and determining whether the one or more security predicates extracted from the modified query are consistent with one or more security descriptors for a field of the database; and
    return the determined data in response to the modified query.

2. The system as in claim 1, wherein the database comprises an object-oriented database.

3. The system as in claim 1, wherein the security for the field is designated by having an attribute associated with a field type.

4. The system as in claim 3, wherein the attribute is stored as information in a row of the database.

5. The system as in claim 1, wherein the data comprises a set of database information from a plurality of fields.

6. The system as in claim 1, wherein the one or more security predicates are generated for the query after receiving the query and before modifying the query.

7. The system as in claim 1, wherein the security for the field of the database is preconfigured.

8. The system as in claim 1, wherein the one or more security predicates are indicative of one or more security privileges of a user.

9. The system as in claim 8, wherein the query corresponds to a request from the user.

10. A method, comprising:
  receiving a query, wherein the query comprises one or more security predicates;
  determining, using a processor, data to return in response to the query, wherein determining the data to return comprises extracting the one or more security predicates from the query and determining whether the one or more security predicates extracted from the query are consistent with one or more security descriptors for a field of a database; and
  returning the determined data in response to the query.

11. The method as in claim 10, wherein the database comprises an object-oriented database.

12. The method as in claim 10, wherein the security for the field is designated by having an attribute associated with a field type.

13. The method as in claim 12, wherein the attribute is stored as information in a row of the database.

14. The method as in claim 10, wherein the data comprises a set of database information from a plurality of fields.

15. The method as in claim 10, wherein the one or more security predicates are generated for the query after receiving the query.

16. The method as in claim 10, wherein the security for the field of the database is preconfigured.

17. The method as in claim 10, wherein the one or more security predicates are indicative of one or more security privileges of a user.

18. The method as in claim 17, wherein the query corresponds to a request from the user.

19. A computer program product, the computer program product being embodied in a non-transitory computer readable medium and comprising computer instructions for:
  receiving a query, wherein the query comprises one or more security predicates;
  determining, using a processor, data to return in response to the query, wherein determining the data to return comprises extracting the one or more security predicates from the query and determining whether the one or more security predicates extracted from the query are consistent with one or more security descriptors for a field; and
  returning the determined data in response to the query.

20. The computer program product as in claim 19, the computer program product comprising computer instructions for:
  receiving a second query, wherein the second query is modified to comprise one or more second security predicates;
  determining second data to return in response to the second query by examining the one or more second security predicates, comprised in the second query, with respect to one or more second security descriptors for a second field; and
  returning the determined second data in response to the second query.

* * * * *